United States Patent [19]

Wille

[11] Patent Number: 4,515,831
[45] Date of Patent: May 7, 1985

[54] COATING RECOVERABLE SHEETS

[75] Inventor: Marc Wille, Baal, Belgium
[73] Assignee: N. V. Raychem S. A., Belgium
[21] Appl. No.: 435,158
[22] Filed: Oct. 19, 1982
[30] Foreign Application Priority Data Oct. 23, 1981 [GB] United Kingdom ................ 8130259

[51] Int. Cl.³ .................... B05D 3/08; B05D 3/02; B05D 1/28; C23C 13/08
[52] U.S. Cl. ................... 427/223; 118/50.1; 118/641; 427/296; 427/316; 427/374.1; 427/428; 427/393.5
[58] Field of Search ............ 427/296, 316, 374.1, 427/393.5, 428, 223; 118/50.1, 641; 156/244.17, 244.23, 244.24, 272.2; 264/230

[56] References Cited

U.S. PATENT DOCUMENTS

| 2,027,962 | 1/1936 | Currie | 18/55 |
|---|---|---|---|
| 2,648,097 | 8/1953 | Kritchever | 18/47.5 |
| 3,086,242 | 4/1963 | Cook et al. | 18/1 |
| 3,255,034 | 6/1966 | Covington et al. | 427/223 |
| 3,379,218 | 4/1968 | Conde | 138/99 |
| 3,597,372 | 8/1971 | Cook | 260/4 |
| 3,976,528 | 8/1976 | James | 156/272.2 X |
| 3,988,399 | 10/1976 | Evans | 264/230 |
| 4,061,527 | 12/1977 | Traise | 156/519 |
| 4,425,174 | 1/1984 | McLaughlin | 156/272.2 X |

FOREIGN PATENT DOCUMENTS

| 0045213 | 7/1981 | European Pat. Off. |
|---|---|---|
| 2505979 | 8/1976 | Fed. Rep. of Germany . |
| 2600647 | 9/1976 | Fed. Rep. of Germany . |
| 2702241 | 7/1977 | Fed. Rep. of Germany . |
| 1392212 | 4/1975 | United Kingdom . |
| 1440524 | 6/1976 | United Kingdom . |
| 1545571 | 5/1979 | United Kingdom . |
| 2031106A | 4/1980 | United Kingdom . |

Primary Examiner—Michael R. Lusignan
Attorney, Agent, or Firm—Dennis E. Kovach; T. Gene Dillahunty; Herbert G. Burkard

[57] ABSTRACT

A heat-recoverable polymeric sheet is coated with a solid sheet of heat-activatable sealant by heating the sheet preferably to a temperature above the crystalline melt point of the polymer, applying, preferably by means of a roller, the sealant sheet to the heated polymer sheet while the polymer sheet is at a temperature capable of activating the sealant so as to adhere it to the polymer sheet. The polymer sheet may be flame-brushed after heating and before application of the sheet of sealant. The technique is particularly useful for sheets intended as wrap-around sleeves for use as enclosures, and which thus have closure rails adjacent opposing longitudinal edges thereof.

30 Claims, 14 Drawing Figures

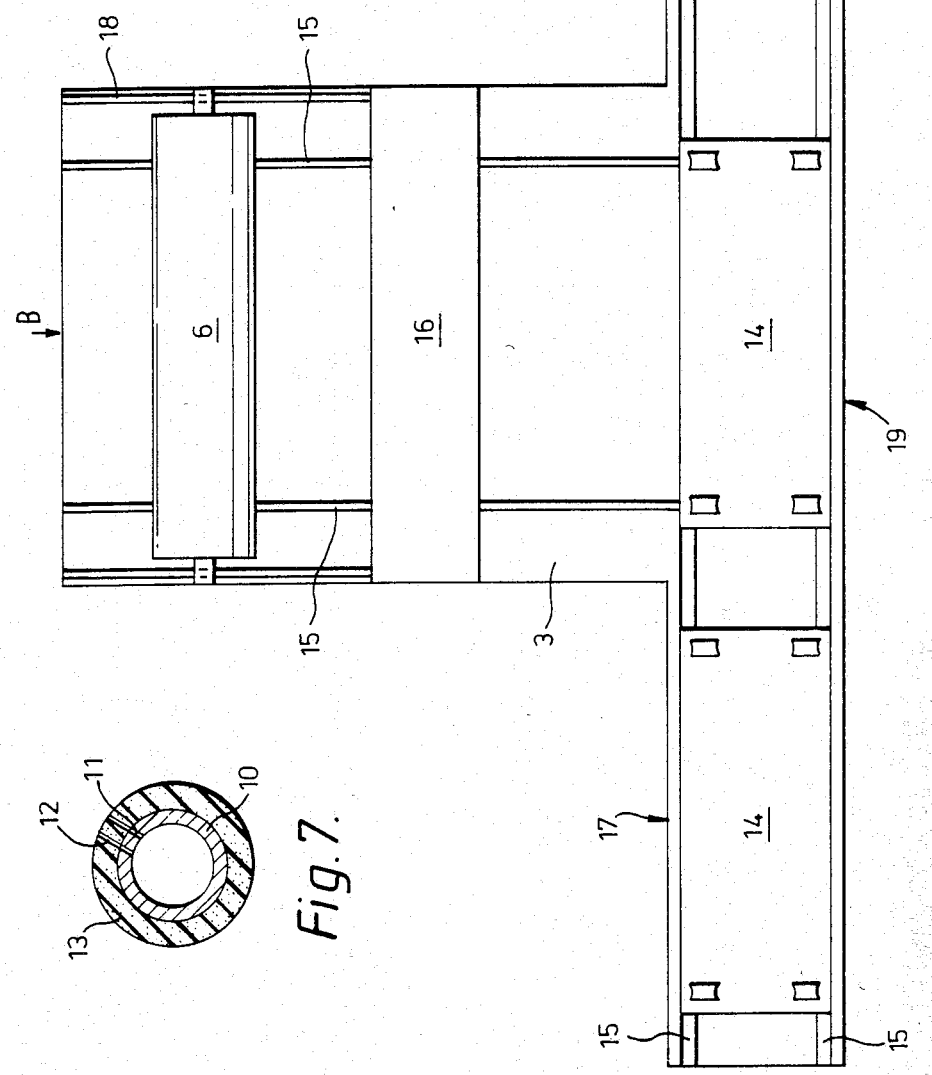
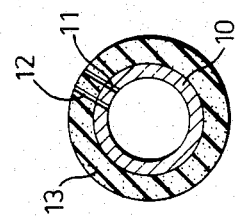

COATING RECOVERABLE SHEETS

This invention relates to a method and apparatus for coating recoverable sheets.

Recoverable sheets of materials such as, for example, cross-linked polyethylene, are well known, for example from U.S. Pat. Nos. 2,027,962, 3,086,242, 3,597,372 and British Pat. No. 1,440,524, and are used in applications such as splicing of cables where a heat or otherwise recoverable sheet may conveniently be wrapped around the splice and recovered to protect it against the environment. A known wraparound type of heat recoverable sheet is provided with closure means such as raised ridges or rails which are held together by means such as a metal channel, as described for example in British Patent Specification No. 1,155,470. Wraparound sheets of this kind are clearly convenient to use where the cable splice does not permit sliding of a closed circular sleeve thereover.

Known wraparound sheets or sleeves may be produced by moulding or continuous extrusion with the closure rails formed integrally with the sheet by expansion to the heat recoverable state by stretching at an elevated temperature, preferably above the crystalline melting point of the polymer in question.

The sheet is normally then coated with a fluid sealant, e.g. a hot melt adhesive, which may be spread onto the sheet by means such as extrusion or hopper coating, in order to provide the surface which will be inside the splice enclosure in use with a sealant to help exclude moisture and other environmental contamination.

Coating with a fluid sealant can be difficult to perform with precision and without waste. We have discovered a way of overcoming these problems by using a solid sealant.

The present invention therefore provides a method of sealant coating a heat-recoverable polymer sheet, comprising heating the sheet to an elevated temperature, preferably to a temperature at or above the crystalline melting point of the polymer, applying a solid sheet of heat activatable sealant preferably a hot melt adhesive or a mastic, to the heated polymer sheet while the polymer sheet is at a temperature capable of activating the sealant so as to adhere it to the polymer sheet.

The invention also consists in an apparatus for sealant-coating a heat-recoverable polymer sheet with a solid sheet of heat-activatable sealant, which comprises: (a) a support for the polymer sheet, having a gripping system which can hold the polymer sheet in a substantially even configuration on the support; (b) a heating zone which can heat the polymer sheet to a temperature sufficient for the sealant to be activated on contact with the polymer sheet; (c) a flame brushing zone; and (d) a roller for pressing the sheet of sealant onto the surface of the heated polymer sheet; the apparatus being so arranged that the support can pass sequentially through the heating zone, the brushing zone, and past the roller.

The invention is thus well adapted, although not restricted, to coating individual pieces of heat-recoverable sheet, and the invention advantageously alleviates adhesive coating problems such as messiness and inaccurate positioning of the adhesive coat, which can arise if traditional hot melt coating methods are used. The invention has the further advantages that because the solid sheet of sealant is pre-formed, more uniform coating thickness can be attained and coating right up to the edges of the polymer sheet can be conveniently achieved.

The sealant sheet is preferably applied by means of a roller, which may conveniently be arranged to move across the polymer sheet while the latter is held stationary, so that the leading edge of the sealant sheet is wrapped around the roller and contacts the hot stretched polymer sheet moving substantially countercurrent to the trailing portion of the sealant sheet. It is preferred to construct the roller with releasable means for holding the sealant sheet thereon, which means are used to hold the leading portion of the sheet prior to contact with the polymer sheet. The holding means for the roller is preferably released upon proper contact of the leading edge of the sealant sheet with the polymer sheet, so as to prevent the sealant sheet from wrapping too far around the roller, while nevertheless ensuring adequate contact of the leading edge with the polymer sheet. The preferred holding means for the sealant sheet is vacuum operated and preferably comprises one or more holes in the roller through which the vacuum applied to the interior of a hollow roller can hold the sheet thereto. Since the alignment of a row of such holes on the roller can be predetermined, means can be provided automatically to discharge the vacuum, thus releasing the leading edge of the adhesive sheet, when the roller reaches the position to establish initial contact of the leading edge of the sealant sheet with the hot polymer sheet. The roller is preferably provided with a resilient surface, such as a wrapping of foamed polymeric material, so as to take up any irregularities in the stretched, hot polymer sheet, such irregularities normally occurring along the line of the aforementioned closure rails, which are on the opposite surface of the sheet from the sealant coating.

In wraparound sheets having the aforementioned rail-and-channel type of closure, it is desirable to maintain a region of relatively unexpanded polymer sheet material close to the rails. This tends to minimise distortion of the rails during subsequent recovery of the sheet, and can advantageously be achieved by gripping the rails in metal jaws of suitable gripping means, which touch the sheet near the base of the rails. This keeps the rails and immediately adjacent sheet areas relatively cool during the heating of the sheet, and the cooler polymer is less susceptible to distortion. Where the polymer sheet does not have such rails, simpler designs of gripping means will generally be sufficient.

The heater used to heat the polymer sheet is preferably electric and preferably extends over the full surface area of the polymer sheet. Suitable electric heating may be provided by an array of lamps, arranged for example in individually controllable rows. Such control can allow the various parts of the sheet (web, flap and rails for example) each to be heated to the optimum extent. The heating step can also be used to effect chemical cross-linking of the polymer sheet if desired, although radiation cross-linking is preferred for most purposes.

After the heating it is preferred to flame brush the surface of the sheet to be coated, so as to enhance the adhesion of the hot melt adhesive or other sealant. It is also preferred to reheat the sealant coated sheet to a temperature which softens or anneals the sealant so as to reduce the occurrence of entrapped air bubbles and further improve adhesion and appearance in the final product.

Apparatus for carrying out the method according to the invention may be devised in various ways by suitably skilled persons, and will comprise means for holding, heating, and optionally flame brushing the sheet, together with the necessary sealant sheet application means, e.g. a coating roller, preferably having a resilient surface such as foamed polymer, and optionally means for re-heating the sealant-coated sheet and for cooling it. Where the polymer sheet has rails in order that it may later be closed around, for example a splice in a cable, it may be desirable that the means for holding the sheet has special provision for accommodating the rails without damaging them. The necessary movement of the polymer sheet between the heating, flame brushing, adhesive coating, and cooling stations may be achieved by movement of the sheet holder between the relevant pieces of apparatus, or by movement of all or part of the apparatus with the sheet holder fixed. Preferably, the sheet holder moves sequentially under a heater, under the flame brush, to the sealant coating roll which then moves across the stationary polymer sheet, back to the heater for re-heating, and then to a cooling area. Compressed air or other means may be used to facilitate cooling of the finished sheet, thus increasing throughput. Preferably, cooling is effected progressively from the free edges of the sheet inwards towards the centre. Suitable means for moving the sheet holder and coating roll in this way may readily be selected by skilled persons, long screw-threaded shafts with suitable rotational drive means being one possibility. The means for releasing the adhesive holding means on the roller on contact of the leading edge of the adhesive with the hot polymer sheet may also be devised according to convenience provided that it brings about adequate contact of the leading edge with the hot sheet and prevents undesirable wrapping of the sealant sheet around the coating roller beyond the point of contact with the hot sheet.

The invention will be more fully understood by reference to the accompanying drawings, which are provided by way of Example, wherein:

FIG. 7 shows a cross-section of the preferred adhesive coating roller;

FIG. 8 is a diagramatic plan showing a preferred layout of the apparatus of the invention;

Figure 1:
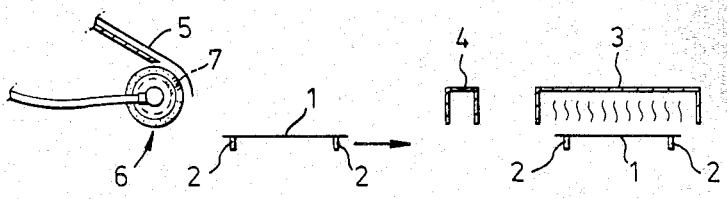
FIGS. 1 to 6 show schematically various stages of the method according to this invention.
Figure 2:

Referring to the drawings, FIG. 1 shows a heat-recoverable sheet 1 having closure rails 2, moving from a starting position to a position underneath the heater 3, where the sheet is heated to a temperature above the crystalline melting point of the polymer.

The heated sheet then passes back from the heater 3 under the flame brush 4, which flame brushes the sheet surface in preparation for application of the sealant.

Figure 3:

FIG. 3 shows the hot flame brushed sheet in position where initial contact of the leading edge of solid sealant sheet 5 is established, at which time the vacuum applied to the hollow coating roll 6 is removed so as to release the leading edge of the sealant sheet from the row of holes 7 through which the vacuum acts to secure the leading edge of the sealant to the roller.

Figure 4:
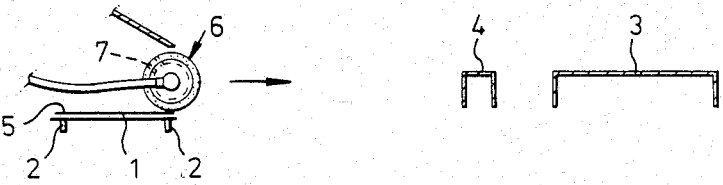

The hot polymer sheet is now stationary, while the coating roll moves as shown in FIGS. 3 and 4 until all of the solid sealant sheet has been pressed against the polymer sheet surface and is sufficiently activated by the temperature of the sheet to adhere thereto.

Figure 5:
Figure 6:
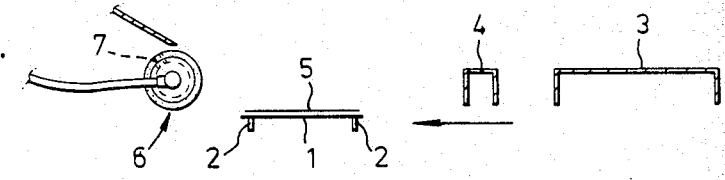

The polymer sheet coated with sealant then returns to the heater 3 as shown in FIG. 5 for reheating to anneal the sealant coating, thus reducing air entrapment and improving the adhesion and appearance of the sealant coating.

The final step is for the coated and annealed sheet to return to the starting position, where it is cooled and removed from the holder.

Apparatus of this kind lends itself fairly well to automation, and simple trial and error can soon establish suitable heating times and temperatures for a given product.

These values will depend on the expansion ratios to which the material has been stretched, since greater care is necessary at higher temperatures for high expansion ratios to avoid splitting the sheet.

As shown in endwise cross-section in FIG. 7, the preferred adhesive coating roller is a hollow metal roll 10 having a row of holes 11 across its width which correspond to holes 12 in a foam layer 13 carried on the surface of the roll for the aforementioned purposes. Suitable foams can readily be chosen, and could be applied to the metal roll as a single piece, or as a wrapped spiral, or in any other manner which would suit the present purposes.

The sealant sheet is preferably applied to the polymer sheet while the latter is at a temperature above the crystalline melting point of the polymer.

Figure 9:
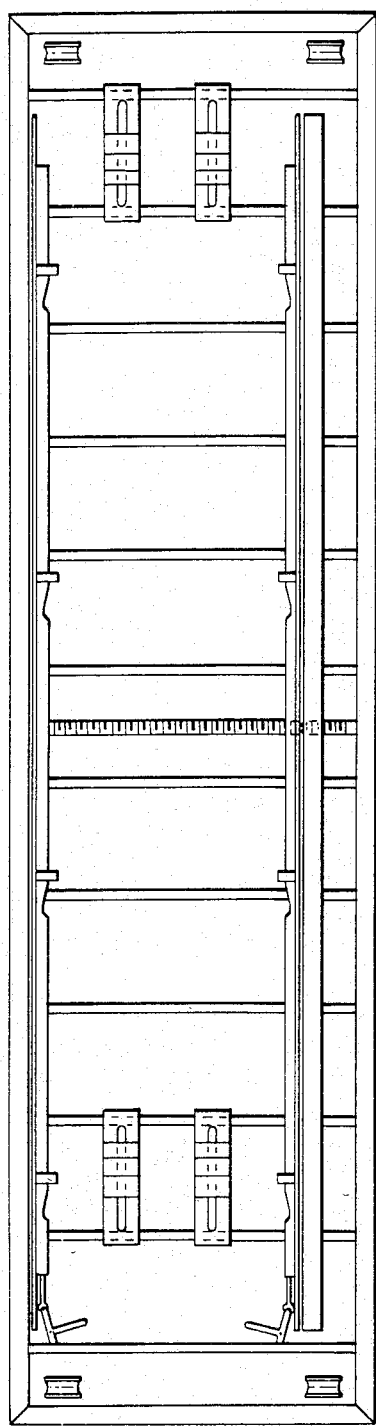
FIG. 9 shows in more detail a single trolley used in the apparatus of FIG. 8.
Figure 10:
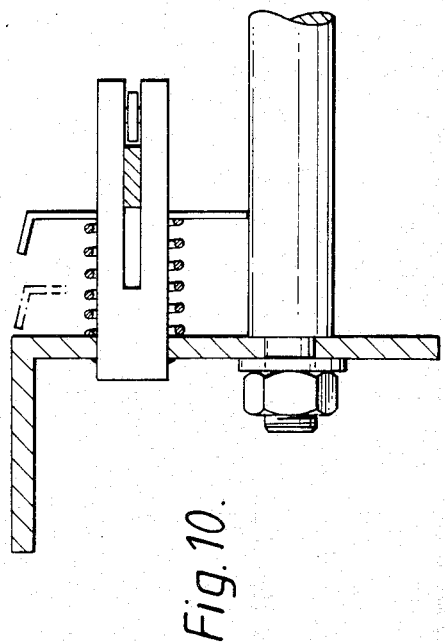
FIG. 10 is a rail gripping system, in the open position, as used in the trolley of FIG. 9.
Figure 11:
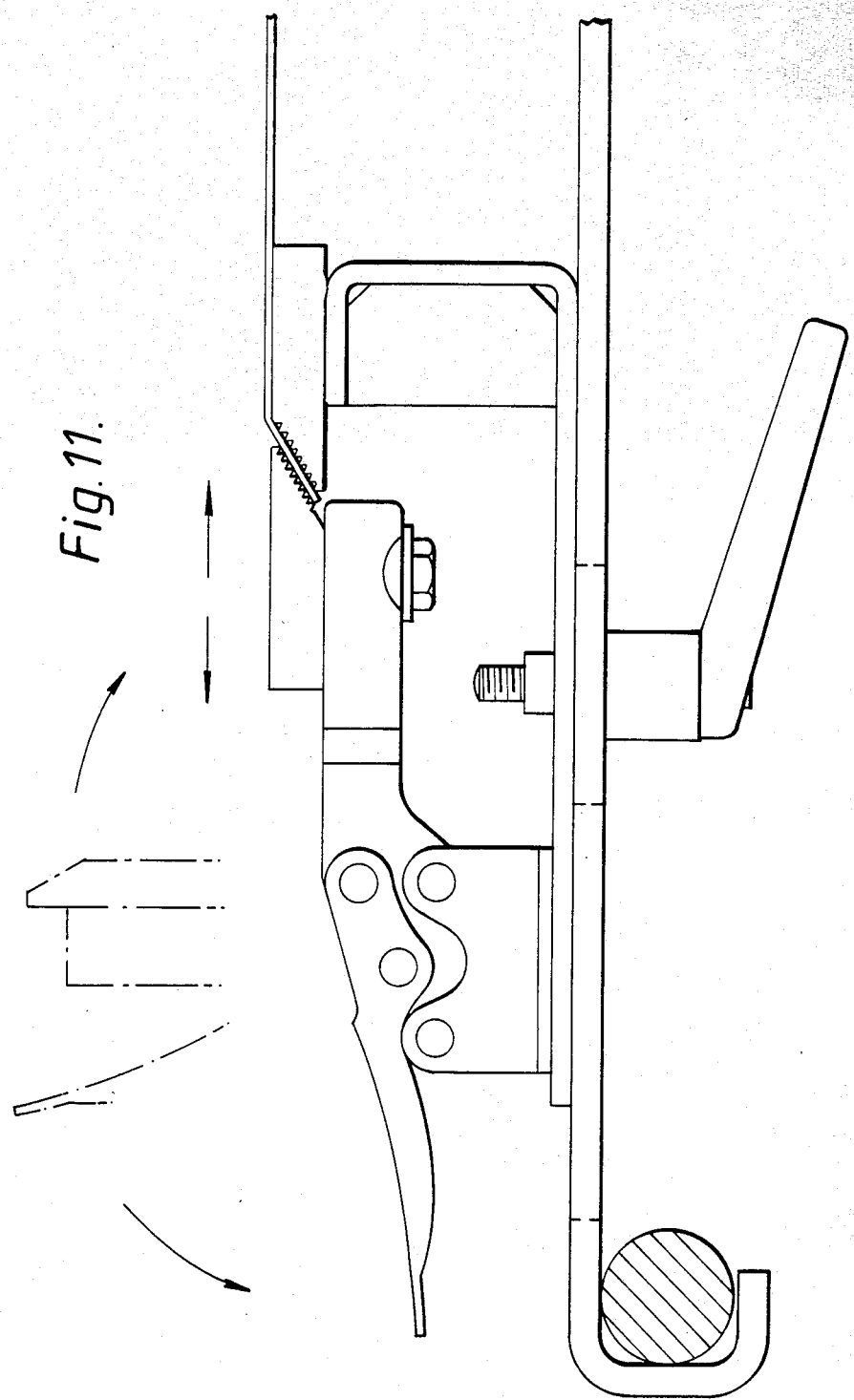
FIG. 11 shows in cross-section a web grabbing system taken in the direction A—A of FIG. 9.

FIG. 8 is a diagramatic plan of a preferred apparatus of the invention. The figure not only shows a preferred physical layout of the apparatus, but also shows the logistics of the method. The apparatus consists basically of trolleys 14 for carrying the polymer sheet before and after cooling, and rails 15 which allow the trolleys to be moved in two mutually perpendicular directions arranged as a "T". In one of these two directions (the cross-bar of the "T") there are a first cooling zone 17, a loading zone 19, and a second cooling zone 17. The loading zone 19 leads down the perpendicular of the "T", to a heating zone 3, via treatment zone 16 (such as a flame brushing zone), to a coating roller 6. The zones 3 and 16 and the roller 6 will conveniently be mounted in a superstructure above the level of the rails and trolleys. The sheet of sealant with which the polymer sheet is to be coated is loaded at position B onto the roller 6. The roller may be hollow and have vacuum ducts as described above to cause the sealant sheet to follow its circumference as it is rotated. The roller may move along rails 18 as it rotates, or alternatively its axis may remain stationary while the trolley moves underneath it. In either way the intention is that the sealant sheet is evenly pressed over the surface of the polymer sheet, and caused to adhere thereto. The design of the trolleys is not critical, but it is preferred that they have a separate frame for gripping the polymer sheets: a preferred trolley is illustrated in FIG. 9. Such a frame will, in general, have opposing rail gripping means, as illustrated in FIG. 10, which maintain the sheet under the correct transverse tension. Transverse tension may, however, cause scalloping in the ends of the polymer sheet. In order to preserve the sheets generally rectangular shape during the heating and coating, web gripping means may therefore be provided. In FIG. 9 two web gripping means are provided at each end of the polymer sheet, and a cross-section of a single web gripping assembly taken in the direction A—A of FIG. 9 is shown in FIG. 11. The absolute sizes of the apparatus, the trolleys and the gripping means will clearly depend on the size of polymer sheets to be coated, and therefore, for example on what type of splice is to be covered by the finished product. As a guide, however, the gripping means shown in FIGS. 10 and 11 can be regarded as about life-size for many applications, the trolley of FIG. 9 about 1:16 scale, and the overall layout of FIG. 8 about 1:40 scale.

The general sequence of events will be as follows: a polymer sheet is loaded and fixed onto a trolley in one of the positions 17; the trolley is moved to position 19 and then to the heating zone 3, the trolley then passes through the flame brushing zone 16 to the roller 6; at the roller, a sheet of sealant is fed into the apparatus, and as the roller rotates the sealant is pressed onto the hot polymer sheet, to which it adheres; the roller containing the coated polymer sheet then passes back to a position 17. When it is allowed to cool; the sequence is then repeated using a trolley from the vacant position 17.

Other finishing operations can be carried out as desired, e.g. trimming, cutting to specific sizes, and coating with thermochromic indicator paints.

An embodiment of grippihg jaws that can be used to secure the sheet to the trolley is illustrated by way of Example in FIGS. 10-14 as applied to the kind of wraparound closure known from British Pat. No. 1155470.

Figure 12:
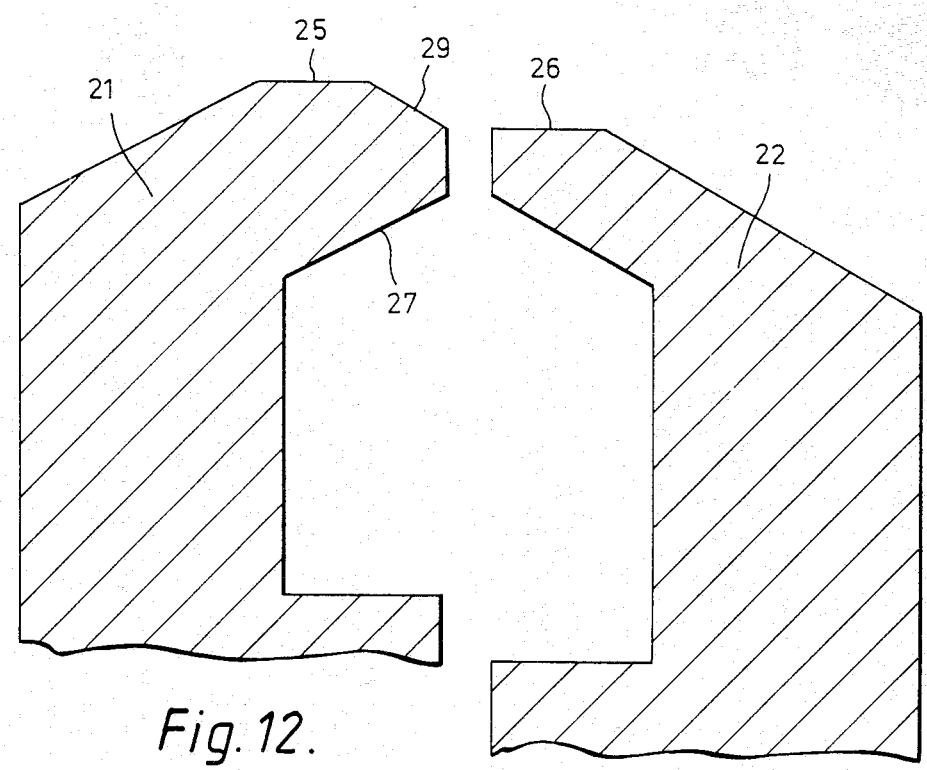
Fig. 12-14 show an alternative type of rail gripping system.
Figure 13:
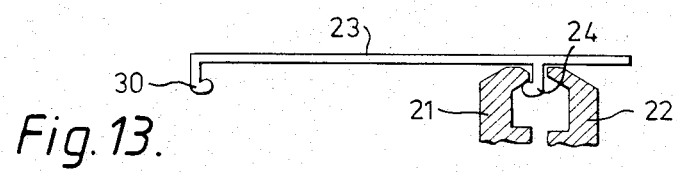
Figure 14:
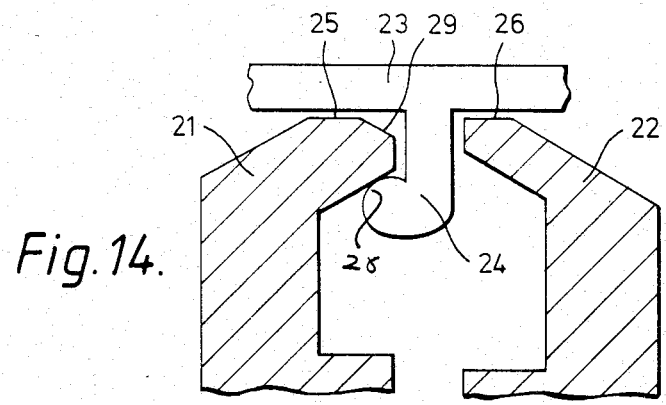

In FIGS. 12-14, the jaws 21, 22 are shaped to give the desired support (and heat sink) to the sheet 23 near the foot of the rail 24 by means of flat surfaces 25 and 26; the jaws being designed to ensure that this contact between the sheet 23 and the support surfaces 25, 26 is properly established. This supporting contact plays a major part of preventing uacceptable deformation of the rails that might otherwise occur.

The correct contact of the jaws with the polymer sheet can be ensured by the inclined surface 27 on the jaw 21 which presses on the projecting knob or lip 28 of the closure rail 24 (see FIG. 11) in such a way as to pull the rail downwards (as illustrated) when the jaws 21, 22 are tightened thereon. The size and slope of the jaws 21 are selected to suit the rail in question, and it should be noted that the two rails of some wraparound closures are of different heights to allow for the overlap of the sheet ends in use. Thus two pairs of gripping jaws of slightly different dimensions are preferably used as exemplified by the different dimensions of the illustrated jaws 21 and 22. The jaw 21 preferably has an upper (as shown) sloping surface 29 to facilitate the wedge-like fit into the rail, while the complementary jaw 22 is square cornered to give full support to the opposite side of the rail. The parts are not shown to scale. The area of the contact portions 25, 26 is selected to produce the desired substantially unexpanded area of sheet at the foot of the rail, and it is advisable to shield the outermost jaw at the rail 30 at the extreme edge of the sheet (as shown on the left in Fig.13) in order to prevent overheating of the rail by heat transfer through the exposed one of the pair of jaws (not shown) holding that rail. A water-cooled plate is preferred for this cooling, but any effective heat shield may be used. It will be observed that only one of the jaws holding that rail 30 can contact and support the adjacent sheet material, but the principle is similar to that described above for the other rail 24. This procedure and apparatus are advantageous over simple edge clamping of the sheet since waste due to clamp marks is eliminated and the desired substantially unexpanded regions of sheet near the rail can conveniently be maintained.

I claim:

1. A method of sealant-coating heat-recoverable polymer sheet, comprising heating the heat-recoverable polymer sheet to an elevated temperature, and subsequently applying a solid sheet of heat-activatable sealant to the heated polymer sheet while the polymer sheet is at a temperature capable of activating the sealant so as to adhere it to the polymer sheet.

2. A method according to claim 1, wherein individual heat-recoverable polymer sheets are individually sealant coated.

3. A method according to claim 1, wherein the sheet of sealant is applied by means of a roller.

4. A method according to claim 3, wherein the roller moves across the surface of the stationary polymer sheet to effect the coating.

5. A method according to claim 3, wherein the leading edge of the sheet of sealant is wrapped around the roller so that the trailing portion thereof and the portion thereof in contact with the polymer sheet move substantially countercurrent to each other during the application of the sheet of sealant to the polymer sheet.

6. A method according to claim 3, wherein the roller has releasable means for holding the sheet of sealant thereto, and at least the leading portion of the sheet of sealant is held thereby prior to contact with the polymer sheet.

7. A method according to claim 6, wherein the holding means is released upon contact of the leading edge of the sheet of sealant with the polymer sheet.

8. A method according to claim 6, wherein the holding means is vacuum operated.

9. A method according to claim 8, wherein the holding means comprises one or more holes in the roller whereby vacuum is applied to hold the sheet of sealant.

10. A method according to claim 3, wherein the roller has a resilient surface.

11. A method according to claim 10, wherein the resilient surface is provided by a layer of foamed polymeric material on the surface of the roller.

12. A method according to claims 1, wherein the polymer sheet is flame brushed before application of the sheet of sealant thereto.

13. A method according to claim 1, wherein the sealantcoated polymer sheet is re-heated after the application of the sealant.

14. A method according to claim 1,12 or 13, wherein the polymer sheet is moved on a polymer sheet holder to bring it sequentially under at least two of: means for carrying out heating, flame brushing, re-heating, and cooling.

15. A method according to claim 1, wherein the polymer sheet has substantially parallel regions at or near opposed edges thereof and is held during the heating and application by gripping means which grip said regions.

16. A method according to claim 1, which additionally comprises cooling the coated polymer sheet progressively from its edges towards its centre.

17. A method according to claim 1, wherein the coating is carried out with the polymer sheet temperature above the crystalline melting point of the polymer.

18. A method according to claim 1, wherein the heat-activatable sealant is a hot-melt adhesive, or a mastic which is substantially solid before the heating.

19. Apparatus for sealant-coating a heat-recoverable polymer sheet, comprising means for holding and means for heating the heat recoverable polymer sheet, and means for applying a solid sheet of heat-activatable sealant thereto subsequent to the polymer sheet being heated by the means for heating to a temperature capable of activating the sealant so as to adhere it to the polymer sheet.

20. Apparatus according to claim 19, in which the means for applying comprises a roller for pressing the sheet of sealant against the surface of the polymer sheet.

21. Apparatus according to claim 20, wherein the roller is provided with releasable means for holding the sheet of sealant thereto.

22. Apparatus according to claim 21, wherein the means for holding is vacuum operated.

23. Apparatus according to claim 22, wherein the means for holding comprises at least one hole in the surface of the roller whereby a vacuum may be applied to hold the sheet of sealant to the roller.

24. Apparatus according to claim 21, including means for automatically releasing the holding means to release the sheet of sealant from the roller upon contact of the sheet of sealant with the hot polymer sheet.

25. Apparatus according to claim 19, which includes means for flame brushing the polymer sheet before application of the sheet of sealant thereto and/or means for reheating the sealant-coated sheet.

26. Apparatus according to claim 19, wherein the polymer sheet has substantially parallel regions at or near opposed edges thereof, and the means for holding comprises gripping means which grip said regions.

27. Apparatus according to claim 26, which additionally comprises a pair of second gripping means which acts in a direction substantially perpendicular to that of the first-mentioned gripping means, and which prevents or reduces scalloping which may result from tension in the polymer sheet across the first-mentioned gripping means.

28. Apparatus for sealant-coating a heat-recoverable polymer sheet with a solid sheet of heat-activatable sealant, which comprises:
   (a) a support for the heat-recoverable polymer sheet having a gripping system which holds the polymer sheet in a substantially even configuration on the support;
   (b) a heating zone which heats the polymer sheet to a temperature sufficient for a solid sheet of heat-activatable sealant to be activated on contact with the polymer sheet;
   (c) a flame brushing zone; and
   (d) a roller which presses the solid sheet of sealant onto the surface of the heated polymer sheet causing said sheet of sealant to be activated; the apparatus being so arranged that the support passes sequentially through the heating zone, the brushing zone, and past the roller.

29. Apparatus according to claim 28, in which the gripping system comprises first gripping means which hold the polymer sheet substantially even in one direction, and second gripping means which can prevents scalloping at opposed ends of the sheet that may result from tension in the sheet in said one direction.

30. Apparatus according to claim 19, the heat-recoverable polymer sheet being heated to a temperature above the crystalline melting point of the polymer.

* * * * *